United States Patent [19]

Baeger

[11] Patent Number: 4,483,591

[45] Date of Patent: Nov. 20, 1984

[54] ELECTRO-OPTICAL DISPLAY ELEMENT AND METHOD FOR ITS MANUFACTURE

[75] Inventor: Holm Baeger, Schwalbach, Fed. Rep. of Germany

[73] Assignee: VDO Adolf Schindling AG, Frankfurt am Main, Fed. Rep. of Germany

[21] Appl. No.: 416,994

[22] Filed: Sep. 13, 1982

[30] Foreign Application Priority Data

Sep. 26, 1981 [DE] Fed. Rep. of Germany ....... 3138373

[51] Int. Cl.$^3$ ............................................... G02F 1/13
[52] U.S. Cl. .................................. 350/320; 350/336; 350/339 R; 350/334
[58] Field of Search .................... 350/339 R, 336, 320, 350/334

[56] References Cited

U.S. PATENT DOCUMENTS

| | | | |
|---|---|---|---|
| 4,132,984 | 1/1979 | Gross | 350/336 |
| 4,140,372 | 2/1979 | Saurer | 350/339 R X |
| 4,362,903 | 12/1982 | Eichelberger et al. | 350/336 X |
| 4,413,257 | 11/1983 | Kramer et al. | 350/336 X |

Primary Examiner—John K. Corbin
Assistant Examiner—Richard F. Gallivan
Attorney, Agent, or Firm—Martin A. Farber

[57] ABSTRACT

In a method for the manufacture of electro-optical display elements in which an electrically conductive layer is applied to a glass substrate and an insulating layer is applied on top thereof, the insulating layer being subjected to a drying process and then to a firing process, a substance which decomposes under the action of heat is then applied after the firing process to the insulating layer in the region of an insulating point, said substance having at least one decomposition component which penetrates into the insulating layer, whereupon the firing process is carried out. In this way there is obtained a particularly simple method of contacting the conductive layer through the insulating layer.

20 Claims, 3 Drawing Figures

ELECTRO-OPTICAL DISPLAY ELEMENT AND METHOD FOR ITS MANUFACTURE

BACKGROUND OF THE INVENTION

Its Manufacture

The present invention relates to electro-optical display elements, particularly liquid-crystal displays and a method for the manufacture thereof, in which an electrically conductive layer is applied to a glass substrate and an insulating layer is then applied on top thereof, the insulating layer being first subjected to a drying process and then to a firing process and then being removed in the region of contacting points of the conductive layer.

As is known, in a large number of electro-optical displays, particularly in the case of nematic, dichroitic or dipole suspension displays, the conductive layers applied to the front or rear glass substrate are covered with an insulating layer in order to prevent the conductive layer from being decomposed by electrolytic processes during the operation of the display element. The manner of procedure here is that, after the application and structuring of the conductive layer, the insulating layer is applied by dipping, whirling or roller-coating. After its application, the insulating layer is subjected at low temperature to a brief drying process and then fired at temperatures of about 400° C. After the conclusion of the firing process, the insulating layer is removed in the region of the contacting points of the conductive layer to which the connections for the control lines are to be subsequently connected, this being done by exposing the contact points by means of scratching or etching. This scratching or etching of the contact points is very time-consuming, with great risk of failure inherent therein. Furthermore, the etching or scratching process can be automated only with considerable difficulties and at high technological expense.

It has also already been proposed not to coat the conductive layers completely with an insulating layer but to leave them free of coating at the contact points. Since the coating of the conductive layers with the insulating substance, for instance silicon oxide, silicon dioxide or else yttrium oxide, is effected by the offset process, extensive re-adjustment of the coating system is necessary for each display, which has a detrimental effect on the flexibility of the manufacture of the display and increases the cost of manufacture. These disadvantages are not present when the layers are applied by the silk-screen process, but such a silk-screen process is very problematical in connection with the insulating layers from a technical standpoint, and for this reason has not been used in mass production up to the present time.

SUMMARY OF THE INVENTION

These disadvantages of the known methods are to be overcome by the present invention. The object of the invention is therefore to provide a method of manufacture which, without great expense, makes it possible to free the contacting points of the conductive layer from the insulating layer and keep them free. Furthermore, the method should be such that it can be automated with the least possible technical expense.

This object is achieved in accordance with the invention in the manner that, after the drying process, a substance which decomposes under the action of heat is applied to the insulating layer in the region of the contacting points, said substance having at least one decomposition component which penetrates into the insulating layer, and after that the firing process is carried out.

The invention proceeds from the discovery that the insulating layer is still very porous after the drying process. If a substance of any nature whatsoever is now introduced into this porous insulating layer and the firing process then carried out, the individual pores in the insulating layer cannot close. This phenomenon, which has an effect on the strength of adherence of the porous part of the insulating layer to the conductive layer, can be advantageously utilized for the further treatment of this part of the layer either with the removal of this part of the layer or by the use of said part of the layer for a conductive material.

In a preferred embodiment of the invention, a metal-organic compound, at least one metal component of which can penetrate into the insulating layer is the applied substance. In this embodiment, therefore, the porous insulating layer is used as a carrier for an electrically conductive metal component of the substance which can diffuse into the pores of the insulating layer during the firing process and, since the pores communicate with each other, thus forms an electrically conductive bridge between the side of the insulating layer which is adjacent to the conductive layer and the other side of the insulating layer. The free end of this bridge can then be used for contacting any connecting wires. In order to obtain an inexpensive and rapidly effected connection of the connecting wires to the free end of the conductive bridge, it is advisable to apply a metal-organic compound having a solderable metal component which penetrates into the insulating layer, such as, for instance, copper or gold. As a metal-organic compound suitable for the present purpose, a dimethyl gold halide, for instance, is considered.

In accordance with another advantageous embodiment of the invention, the applied substance is an organic compound, at least one component of which can penetrate into the insulating layer and become electrically conductive during the firing process. Such a substance may, for instance, be polyvinyl alcohol, which is at least partially converted into carbon during the firing process. The electrically conductive bridge would therefore be made of carbon according to this embodiment.

Contacting of the displays can then be effected in the customary manner by means of conductive rubber.

In accordance with another advantageous embodiment of the invention, a substance is applied which vaporizes or burns at least partially during the firing process and, after the firing process, the insulating layer provided with the decomposition component is removed. In such a process step a bridge of a conductive material is thus not obtained as in the case of the methods described above, but rather, as a result of the at least partially vaporizing or burning substance, one merely prevents a greater bonding action from resulting between the porous layer and the conductive layer at the place where the at least partially vaporizing or burning organic substance is introduced into the pores of the insulating material, so that the part of the layer which has remained porous can be easily removed by brushing or ultrasonics after the firing process. It has been found that particularly good results, i.e. particularly little compression of the insulating layer in the region of the applied substance, can be obtained if an organic substance which vaporizes without residue is applied. Due to the absence of any residue, the individual pore walls, namely, are not increased in their thickness, so that this part of the insulating layer can be removed particularly easily and cleanly. A cellulose compound such as nitrocellulose can, for instance, be used for this method.

The invention furthermore relates to an electro-optical display element, particularly a liquid-crystal display, having two glass substrates arranged spaced from each other, on each of which an electrically conductive layer, an insulating layer and possibly an orientation layer are applied and between which there is a liquid with crystals that align in an electric field, and having electrical connecting elements connected with contacting points of the conductive layer.

Such display elements are known in principle and have the disadvantage that they can be manufactured only at a relatively large expense by the known methods described above. In order to reduce the manufacturing expense the pores of the insulating layer are now, in accordance with the invention, filled in the region of each contacting point by an electrically conductive substance which is in communication, on the one hand, with the contacting point and, on the other hand, with the connecting element.

The filling of the pores of the insulating layer in the region of a contacting point can be effected by the method described above. However, other methods of filling the pores of the insulating layer in the region of the individual contacting points are also feasible. Thus it is possible to fill the pores under pressure with an electrically conductive substance or, with the application of vacuum to the parts of the insulating layer which are adjacent to a contacting point.

It has been found advantageous to fill the pores with a substance containing a dimethyl gold halide. Particularly good results with respect to the contacting of the substance on the one hand with the conductive layer and on the other hand with the connecting wire can be obtained with such a substance.

With the above and other objects and advantages in view, the present invention will become more clearly understood in connection with the detailed description of preferred embodiments, when considered with the accompanying drawings, of which:

DETAILED DESCRIPTION OF THE PREFERRED EMBODIMENTS

Figure 1:
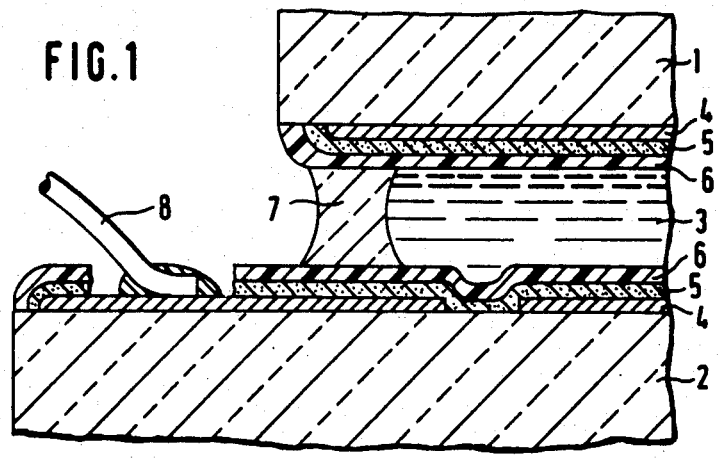
FIG. 1 is a cross section through the edge region of a liquid-crystal cell.

The liquid-crystal cell of FIG. 1 consists of two glass substrates 1 and 2 which are arranged spaced apart from each other and contain a liquid crystal substance 3 between them. On the surfaces of the glass substrates 1 and 2 which are associated with the liquid-crystal substance 3 there are arranged respective electrically conductive layers 4 which consist of indium-tin oxide. On said layers there is an insulating layer 5, which may consist of silicon dioxide, and on the latter an orientation layer 6, which may consist, for instance, of polyimide. The two glass substrates 1 and 2 with the layers arranged thereon are connected with each other by a glass-solder closure 7 or by an adhesive closure.

For connecting different control lines 8 to the liquid crystal cell, the orientation layer 6 and the insulating layer 5 are removed from one of the glass substrates outside the glass solder connection 7. The connecting wires 8 are then soldered to the conductive layer 4 which is then exposed. The removal of the orientation layer does not, in general, afford any difficulty, while removal of the insulating layer 5 entails the disadvantages described above if this layer is removed by the known methods.

Figure 2:
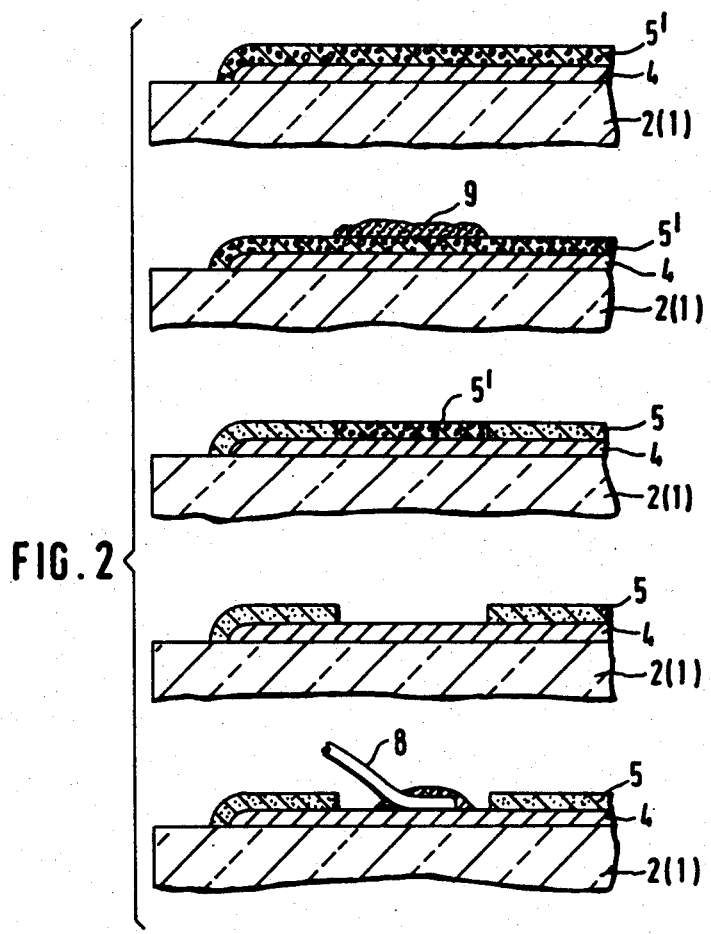
FIG. 2 shows various steps of a first method of manufacture.

After the conductive layer 4 has been applied to the glass substrate 2(1), the insulating layer 5 applied thereover, and a brief drying process performed, the removal of the insulating layer 5 is now, in accordance with the method of the invention as shown in FIG. 2, carried out in the manner that an organic substance 9 which vaporizes during a subsequent firing process is applied to the insulating layer 5' which is still porous after the brief drying process. During the firing process, the vapors of this substance 9 can penetrate into the pores of the insulating layer 5' so that, at the end of the firing process, the insulating layer 5 has remained porous in the region of the applied substance 9, i.e. region 5; while outside this region the insulating layer 5 has become closed, hence a different reference numeral is used, and strong adherence is thus imparted to the underlying conductive layer 4.

By an electrosonic cleaning process the porous material can then be removed without difficulty, so that after the cleaning process the connecting wire 8 can be soldered to the electrically conductive layer 4.

Nitrocellulose can be used as the vaporizing or burning organic substance.

Figure 3:
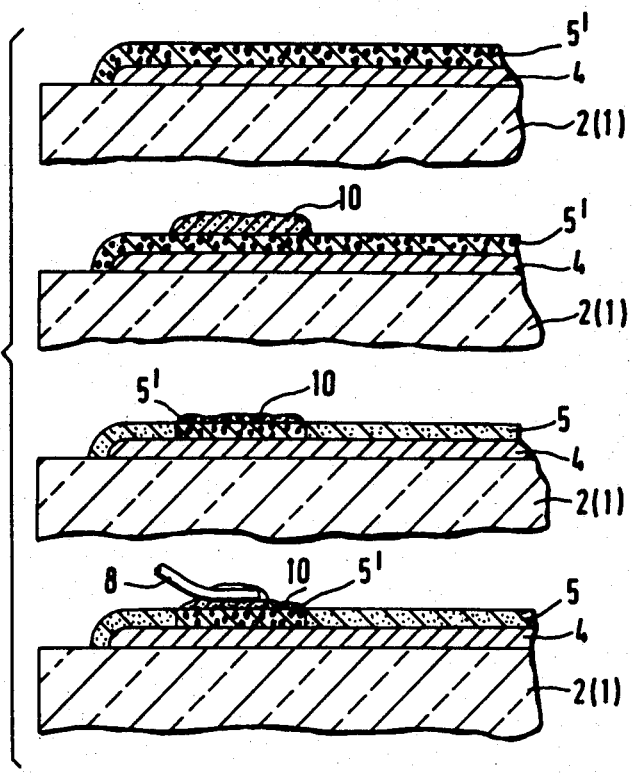
FIG. 3 shows various steps of a second method of manufacture.

In the method shown in FIG. 3, the insulating layer is not removed locally but is, rather, provided with a conductive bridge. For this purpose, a dimethyl gold halide substance 10, for example dimethyl gold chloride, dimethyl gold bromide or else dimethyl gold cyanide or some other dimethyl metal halide substance, is applied to the porous insulating layer 5', which has been subjected to a brief drying process, the substance diffusing into the pores of the insulating layer 5'. After this substance has diffused into the porous insulating layer 5, the substrate is subjected to a firing process, with the result that the insulating layer 5 is hardened except for the region having the conductive metal diffused therein, and bonds itself firmly to the underlying conductive layer 4.

The connecting wire 8 can now be soldered to the conductive substance 10. Since the conductive substance is anchored in its outer region in the consolidated insulating layer 5, a breaking of the conductive substance out of the insulating layer is to be expected only in case of excessive mechanical stressing of the solder point, which does not occur in normal operation.

I claim:
1. In a method of manufacturing electro-optical display elements, particularly liquid-crystal displays, in which an electrically conductive layer is applied to a glass substrate and an insulating layer is then applied on top of said electrically conductive layer, said insulating layer being first subjected to a drying process and then to a firing process and being removed in regions of contacting points for said conductive layer, the improvement comprising, after said drying process, applying a substance which decomposes under the action of heat to said insulating layer in said regions of said contacting points, said substance having at least one decomposition component which penetrates into said insulating layer, subsequently performing said firing process.

2. The method according to claim 1, wherein
said substance which is applied is a metal-organic compound, the latter having at least one metal component constituting said decomposition component which can penetrate into said insulating layer.

3. The method according to claim 2, wherein
said substance which is applied is a metal-organic compound having a solderable metal component constituting said decomposition component which penetrates into said insulating layer.

4. The method according to claim 3, wherein
said solderable metal component of said substance is copper or gold.

5. The method according to claim 1, wherein
said substance which is applied is an organic compound, the latter having at least one component constituting said decomposition component which can penetrate into said insulating layer, said decomposition component becoming electrically conductive during said firing process.

6. The method according to claim 5, wherein
said substance which is applied is polyvinyl alcohol, said substance becoming at least partially converted into carbon during said firing process.

7. The method according to claim 1, wherein
said substance which is applied is an organic substance which at least partially vaporizes during said firing process, further comprising, removing said insulating layer at portions thereof provided with the penetrated said decomposition component, after said firing process.

8. The method according to claim 7, wherein
said substance which is applied is an organic substance which vaporizes without a residue.

9. The method according to claim 7, wherein
said removing is performed by brushing.

10. The method according to claim 7, wherein
said removing is performed by ultrasonics.

11. The method according to claim 1, wherein
said substance which is applied is an organic substance which at least partially burns during said firing process, further comprising, removing said insulating layer at portions thereof provided with the penetrated said decomposition component, after said firing process.

12. The method according to claim 11, wherein
said substance which is applied is a cellulose compound.

13. The method according to claim 11, wherein
said substance which is applied is an organic substance which burns without a residue.

14. The method according to claim 11, wherein
said removing is performed by brushing.

15. The method according to claim 11, wherein
said removing is performed by ultrasonics.

16. In a method of manufacturing electro-optical display elements, particularly liquid-crystal displays, in which an electrically conductive layer is applied to a glass substrate and an insulating layer is then applied on top of said electrically conductive layer, said insulating layer being first subjected to a drying process and then to a firing process and being removed in regions adjacent to contacting points for said conductive layer, the improvement comprising, after said drying process, filling pores of said insulating layer, at said regions of the contacting points, with an electrically conductive substance under pressure.

17. In a method of manufacturing electro-optical display elements, particularly liquid-crystal displays, in which an electrically conductive layer is applied to a glass substrate and an insulating layer is then applied on top of said electrically conductive layer, said insulating layer being first subjected to a drying process and then to a firing process and being removed in regions adjacent to contacting points for said conductive layer, the improvement comprising after said drying process, filling pores of said insulating layer, at said regions of the contacting points, with an electrically conductive substance by means of application of vacuum.

18. In an electro-optical display element, particularly a liquid-crystal display, comprising two glass substrates arranged spaced apart from each other and having facing surfaces, respectively, facing each other, an electrically conductive layer on said facing surfaces of each of said substrates, respectively, an insulating layer on each of said conductive layers, respectively, a liquid having crystals alignable in an electric field and disposed between said insulating layers, and electric connecting elements being electrically connected to contacting points of at least one of said conductive layers, the improvement wherein said insulating layer on said at least one of said conductive layers has pores in regions adjacent each of the contacting points of said conductive layers, an electrically conductive substance fills the pores of said insulating layer in the regions adjacent each said contacting points, and said electrically conductive substance is in contact through said pores with said contacting points and with said connecting elements, respectively.

19. A display element according to claim 18, wherein
said electrically conductive substance is a dimethyl gold halide.

20. A display element according to claim 18, further comprising
orientation layers on said insulating layers, respectively, between the latter and said liquid.

* * * * *